United States Patent [19]
Obata et al.

[11] Patent Number: 5,860,656
[45] Date of Patent: Jan. 19, 1999

[54] SEAL FOR ROTATING SHAFT

[75] Inventors: Hiromi Obata, Sennan-gun; Kenichi Takeda; Atsushi Hosokawa, both of Arita, all of Japan

[73] Assignee: Mitsubishi Cable Industries, Ltd., Amagasaki, Japan

[21] Appl. No.: 944,016

[22] Filed: Sep. 30, 1997

Related U.S. Application Data

[63] Continuation of Ser. No. 632,772, Apr. 15, 1996, abandoned, which is a continuation of Ser. No. 225,524, Apr. 11, 1994, abandoned.

[30] Foreign Application Priority Data

| Apr. 9, 1993 | [JP] | Japan | 5-107455 |
| Nov. 16, 1993 | [JP] | Japan | 5-311360 |
| Nov. 16, 1993 | [JP] | Japan | 5-311361 |

[51] Int. Cl.$^6$ ..................................................... F16J 15/32
[52] U.S. Cl. ........................... 277/559; 277/549; 277/562
[58] Field of Search ..................................... 277/549, 559, 277/562, 565, 570, 573, 574, 576

[56] References Cited

U.S. PATENT DOCUMENTS

| 3,913,925 | 10/1975 | Gyory | 277/134 |
| 4,141,563 | 2/1979 | Wu | 277/152 |
| 4,166,628 | 9/1979 | Blaydon | 277/152 |
| 4,721,314 | 1/1988 | Kanayama et al. | 277/152 |
| 4,723,350 | 2/1988 | Kobayashi et al. | 277/152 |
| 4,755,115 | 7/1988 | Akaike | 277/152 |
| 5,183,271 | 2/1993 | Wadu et al. | 277/152 |
| 5,209,502 | 5/1993 | Savoia | 277/152 |
| 5,350,181 | 9/1994 | Horve | 277/152 |

*Primary Examiner*—Daniel G. DePumpo
*Attorney, Agent, or Firm*—Ladas & Parry

[57] ABSTRACT

When a rotating shaft is at a standstill, a first sealing lip of a first sealing element comes elastically into contact with the shaft, thereby preventing a fluid leakage. Annular grooves are formed on the inner peripheral surface of a second sealing lip of a second sealing element so that a wide contact surface pressure can be obtained between each two adjacent grooves. Accordingly, a fluid leaked from the first sealing element is prevented from leaking to the low-pressure side by means of the second sealing lip. When the rotating shaft is rotating, moreover, the fluid from a fluid chamber is allowed to permeate the gap between the outer peripheral surface of the shaft and the inner peripheral surface of the first sealing lip. Thus, the inner peripheral surface of the first sealing lip is lubricated by means of the fluid, so that the first sealing lip can be prevented from wearing or heating.

21 Claims, 7 Drawing Sheets

SEAL FOR ROTATING SHAFT

This application is a continuation of application Ser. No. 08/632,772 filed on Apr. 15, 1996, now abandoned which is a continuation of Ser. No. 08/225,524 filed Apr. 11, 1994 now abandoned.

BACKGROUND OF THE INVENTION

The present invention relates to a seal for rotating shaft adapted for use in, for example, a compressor for a car air conditioner.

In general, a sealing fluid used in a compressor for a car air conditioner include a refrigerant (gas or oil) and refrigerator oil, which are kept at a predetermined pressure. The sealing fluid must be prevented from leaking without regard to the state, rotating or nonrotating, of the rotating shaft.

Conventionally, there is a rotating shaft seal which is disclosed in Jpn. Pat. Appln. KOKAI Publication No. 4-157264. As shown in FIG. 1, this rotating shaft seal is mounted between a hole of a housing and a rotating shaft (not shown). It integrally comprises a first sealing element a formed of an elastic rubber material and a second sealing element b formed of a synthetic resin (e.g., fluoroplastic (PTFE). The first sealing element a includes a sealing lip portion d which is in contact with the outer peripheral surface of the rotating shaft. The second sealing element b includes a sealing lip portion e which is located at the back of lip portion d and in contact with the outer peripheral surface of the shaft. These two sealing elements are needed because the second sealing element b alone cannot prevent a gas leakage (especially when the rotating shaft is at a standstill), although it can stop a liquid leakage.

Moreover, a plurality of annular grooves f are formed on that surface of the sealing lip portion e of the second sealing element b which is in contact with the rotating shaft, the grooves f extending along the circumference of the shaft. A high contact surface pressure is obtained in the regions defined between the grooves f, so that the sealing performance of the sealing lip portion e is improved.

Conventionally, however, the sealing lip portion d of the first sealing element a is in the form of a sharp edge finished by cutting. If the rotating shaft is rotated under pressure with the sealing lip portion (trim lip) d pressed against the outer peripheral surface of the shaft, therefore, the lip portion d exerts a great force of pressure on the shaft, that is, it produces a high sealing effect. Thus, good lubrication cannot be secured between the sealing lip portion and the outer peripheral surface of the rotating shaft.

Accordingly, the first sealing element a is heated to high temperature, and cannot enjoy a long life. Also, the lubrication between the sealing lip portion e of the second sealing element b and the outer peripheral surface of the rotating shaft is poor. Thus, the sealing lip portion e is liable to be worn out or heated to high temperature.

SUMMARY OF THE INVENTION

The object of the present invention is to provide a seal for rotating shaft with high durability, capable of securely preventing a fluid leakage without regard to the state, rotating or nonrotating, of a rotating shaft.

In order to achieve above object, a seal for rotating shaft according to the present invention is mounted between a hole of a housing having a fluid chamber and a rotating shaft rotatably supported therein and used to seal a fluid from the fluid chamber leaking along the rotating shaft, and comprises a first sealing element located on the side nearer to the fluid chamber, formed of an elastic rubber material, and including a first sealing lip in contact with the outer peripheral surface of the rotating shaft, the first sealing lip having a permeation allowing rim on the inner peripheral surface thereof for allowing the fluid from the fluid chamber to permeate the gap between the outer peripheral surface of the rotating shaft and the inner peripheral surface of the first sealing lip as the rotating shaft rotates, and a second sealing element located at a greater distance from the fluid chamber than the first sealing element, formed of a synthetic resin, and including a second sealing lip in contact with the outer peripheral surface of the rotating shaft, the second sealing lip having annular grooves formed on the inner peripheral surface thereof so as to extend substantially along the circumference of the rotating shaft.

When the rotating shaft is nonrotating, the first sealing lip of the first sealing element, formed of the elastic rubber material, is elastically in contact with the shaft, thereby preventing a fluid leakage.

When the rotating shaft is rotating, on the other hand, the fluid from the fluid chamber is allowed to permeate the gap between the outer peripheral surface of the rotating shaft and the inner peripheral surface of the first sealing lip. Accordingly, the inner peripheral surface of the first sealing lip is lubricated with the fluid, so that the first sealing lip can be prevented from being worn out or heated, thus enjoying improved durability.

While the rotating shaft is rotating, there is a small fluid leakage, since the fluid from the fluid chamber is allowed to permeate the gap between the outer peripheral surface of the shaft and the inner peripheral surface of the first sealing lip. However, the second sealing element includes the second sealing lip which is in contact with the outer peripheral surface of the rotating shaft, and the annular grooves are formed on the inner peripheral surface of the sealing lip. Therefore, a high contact surface pressure can be obtained between the grooves. Thus, the second sealing lip of the second sealing element can prevent the fluid from the first sealing element from leaking to the low-pressure side.

In this manner, the fluid leakage can be securely prevented without regard to the state, rotating or nonrotating, of the rotating shaft, and the durability of the seal can be improved.

DETAILED DESCRIPTION OF THE PREFERRED EMBODIMENTS

Figure 1:
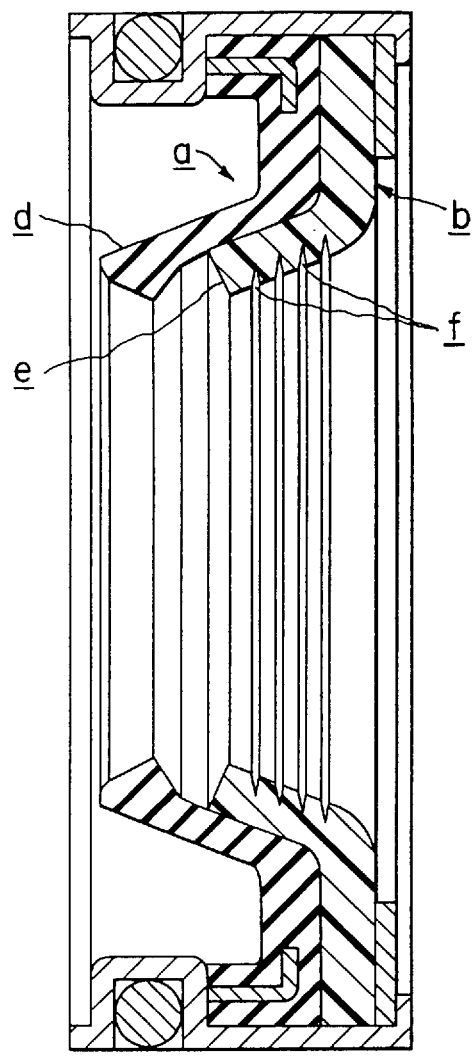
FIG. 1 is a sectional view of a prior art rotating shaft seal.
Figure 2A:
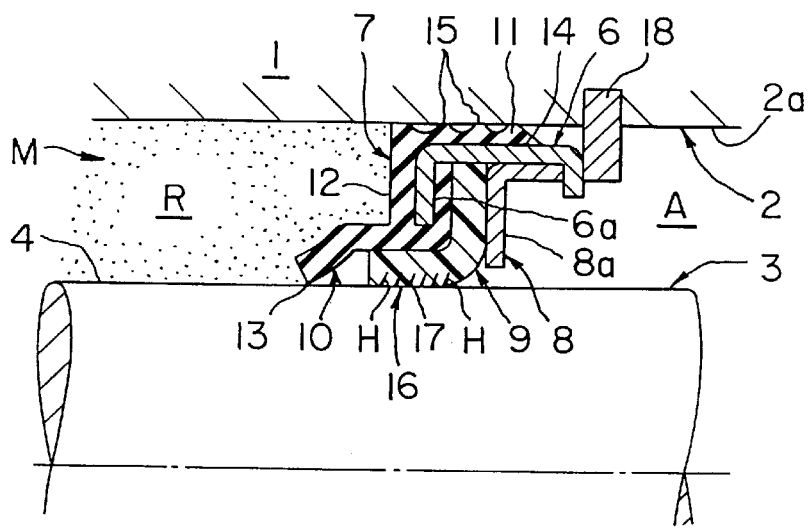
FIG. 2A is a sectional view of a rotating shaft seal according to a first embodiment of the present invention.
Figure 3:
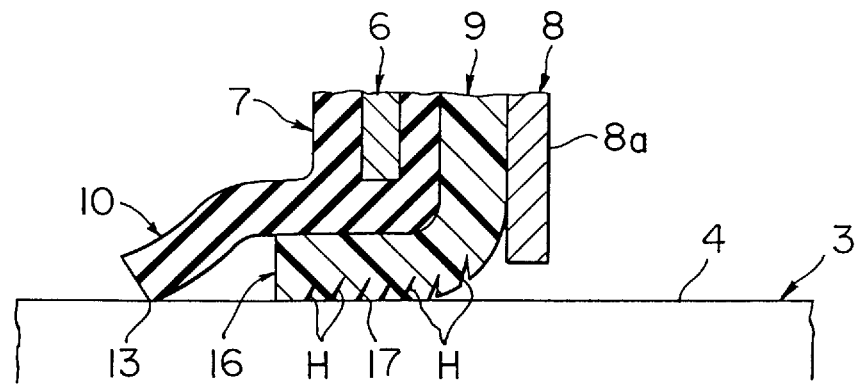
FIG. 3 is an enlarged sectional view of the rotating shaft seal shown in FIG. 2A.

Referring first to FIGS. 2A and 3, a seal for rotating shaft according to a first embodiment of the present invention will be described.

The rotating shaft seal is interposed between a rotating shaft 3 and a hole 2 of a housing 1, such as a casing of a compressor, and is in sliding contact with an outer peripheral surface 4 of the shaft 3, whereby a fluid M in a fluid chamber R is sealed.

The rotating shaft seal comprises a first retainer 6 and a first sealing element 7 of an elastic rubber material retained by means of the retainer 6. A second retainer 8 is mounted on the low-pressure side A of the retainer 6, and a second sealing element 9 is held between the second retainer 8 and the first sealing element 7. The second sealing element 9 is formed of a synthetic resin, such as polytetrafluoroethylene (PTFE) or other fluoroplastic.

The first sealing element 7 is constructed in the following manner.

The first sealing element 7 includes a first sealing lip 10 in contact with the outer peripheral surface 4 of the rotating shaft 3, an outer peripheral abutting piece 11 abutting against an inner peripheral surface 2a of the hole 2, and a connecting piece 12 connecting the abutting piece 11 and the sealing lip 10. An inner collar portion 6a of the first retainer 6 is embedded in the connecting piece 12.

The distal end portion of the first sealing lip 10 is inwardly declined at a predetermined angle to the fluid chamber R. Formed on this distal end portion is a inner rim 13 which projects inward and is in sliding contact with the outer peripheral surface 4 of the rotating shaft 3. This rim 13 allows the fluid from the fluid chamber R to permeate, i.e. pass through the gap between the outer peripheral surface of the shaft 3 and the inner peripheral surface of the first sealing lip 10 as the shaft 3 rotates.

Figure 2B:
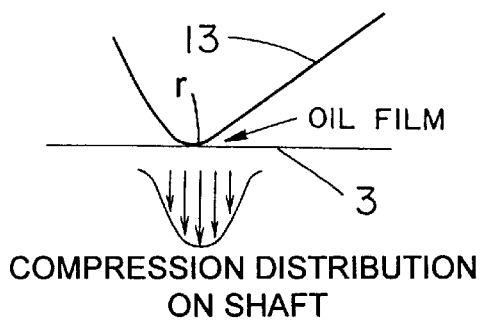
FIG. 2B is an enlarged sectional view showing an example of a permeation allowing rim of a first sealing lip according to the first embodiment.
Figure 2C:
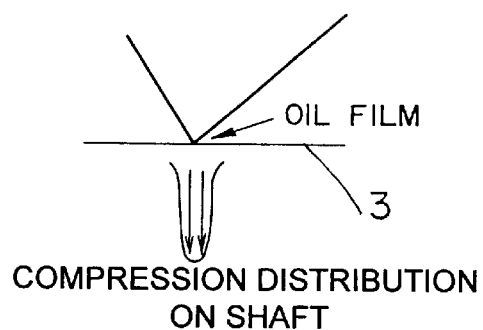
FIG. 2C is an enlarged sectional view of a rim of a conventional first sealing lip in the form of a sharp edge.

When the inner rim 13 is in its natural state before assembling, as shown in FIG. 2B, for example, it may have a bent profile with a predetermined curvature radius r. Desirably, the profile of the rim 13 is in the form of a circular arc with the curvature radius r ranging from 0.005 to 0.3 mm, preferably from 0.01 to 0.1 mm. If the rim 13 is thus formed having the bent or arcuate profile, its compression stress on the rotating shaft 3 has a gentle distribution. In contrast with the case of a sharp-edge configuration (FIG. 2C), therefore, a thick oil film is formed between the rim 13 and the shaft 3, and the oil scraping effect of the lip during the rotation of the shaft 3 is minor, so that a minute leakage occurs.

The elastic rubber molding method is a method for shaping the bent or arcuate profile of the rim 13 of the first sealing lip 10. In consideration of the thermal resistance, refrigerator oil resistance, and freon gas resistance, according to this method, the elastic rubber material used should be composed mainly of a hydrogenated acrylonitrile-butadiene rubber compound, more specifically, a compound consisting of 100 parts by weight of hydrogenated acrylonitrile-butadiene rubber, 2 to 15 parts by weight, preferably 2 to 8, of a crosslinking agent, 0.1 to 10 parts by weight of an auxiliary crosslinking agent, 1 to 20 parts by weight, preferably 1 to 5, of a metal oxide, 30 to 180 parts by weight, preferably 40 to 100, of a strengthening agent, and 0 to 10 parts by weight, preferably 0 to 4, of a plasticizer.

Figure 2D:
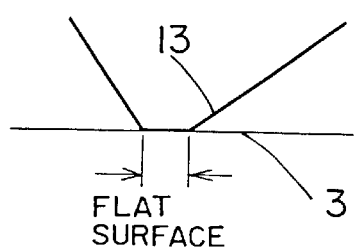
FIG. 2D is an enlarged sectional view of another example of the permeation allowing rim of the first sealing lip according to the first embodiment.

Alternatively, the inner rim 13 may have a flat profile when it is in its natural state before assembling, as shown in FIG. 2D, for example. The length of a flat surface of the rim 13 ranges from 0.1 to 1.0 mm, for example. In this case, the rim 13 may be formed by trimming.

Figure 2E:
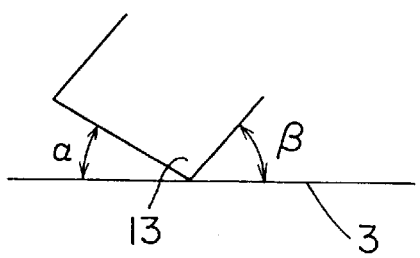
FIG. 2E is an enlarged sectional view of still another example of the permeation allowing rim of the first sealing lip according to the first embodiment.

As shown in FIG. 2E, moreover, the rim 13 of the first sealing lip 10 should preferably be designed so that there is a relation $\alpha < \beta$, where $\alpha$ is its angle on the fluid chamber side (R), and $\beta$ is its angle on the low-pressure side (A).

Furthermore, the outer peripheral abutting piece 11 extends along an outer peripheral surface 14 of the retainer 6, and its inner peripheral surface is fixed to the surface 14. A plurality of outer peripheral ridges 15 are provided on the outer peripheral surface of the abutting piece 11, which is intimately in contact with the inner peripheral surface 2a of the hole 2.

The second sealing element 9 is constructed as follows.

In a state (natural state) before it is fitted with the rotating shaft 3, the second sealing element 9 is in the form of a flat ring-shaped plate, and its inner peripheral edge is situated, as a free end edge, on a plane which extends at right angle to the axis of the shaft 3.

In inserting the rotating shaft 3 in the second sealing element 9, as shown in FIG. 2A, the inner peripheral edge side of the element 9 is bent toward the fluid chamber R (on the high-pressure side) to be fitted in position so that it is in contact with the outer peripheral surface 4 of the shaft 3 for a predetermined width, thus forming a second sealing lip 16.

Thus, the second sealing element 9 is securely held between the connecting piece 12 of the first sealing element 7 and the inner collar portion 8a of the second retainer 8 in a manner such that the second sealing lip 16 is in contact with the outer peripheral surface 4 of the rotating shaft 3.

Preferably, in consideration of the thermal resistance, wear resistance, and low-friction property, a synthetic resin which constitutes the second sealing lip 16 of the second sealing element 9 is composed mainly of a fluoroplastic compound, more specifically a compound containing polytetrafluoroethylene and a filler with the following composition. The filler may be formed of (1) 5 to 35% by weight, preferably 10 to 20, of graphite, (2) 5 to 35% by weight, preferably 15 to 20, of carbon graphite, (3) 5 to 25% by weight, preferably 10 to 20, of carbon fibers, (4) 5 to 25% by weight, preferably 10 to 20, of glass fibers and 1 to 10% by weight, preferably 3 to 8, of molybdenum disulfide, (5) 10 to 30% by weight, preferably 15 to 25, of glass fibers and 1 to 10% by weight, preferably 3 to 8, of graphite, or (6) 1 to 15% by weight, preferably 5 to 10, of carbon fibers and 10 to 30% by weight, preferably 15 to 25, of graphite.

An annular groove H is formed on the inner peripheral surface of the second sealing lip 16 so as to extend substantially along the circumference of the rotating shaft 3.

For example, the annular groove H may be a helical groove which turns around the axis of the flat sealing element 9 in the free state. The turning direction of the groove H is a direction in which the fluid M in the groove is fed to the fluid chamber R (on the high-pressure side) as the rotating shaft 3 is rotated. Thus, the direction of the helix is opposite to the rotating direction of the shaft 3. As the shaft 3 rotates, therefore, the fluid M is returned to the chamber R by the action (pumping effect) of a screw pump.

Alternatively, the annular groove H may be formed of a plurality of concentric notched grooves around the axis of the flat sealing element 9 in the natural state. Preferably, for higher sealing performance, the intervals between the concentric grooves should be reduced with distance from the high-pressure side. The notched grooves H may, for example, be formed by lathing or the like. More specifically, the grooves H are cut by means of a cutting edge so that they are inclined toward the low-pressure side with respect to a contact surface 17, and are normally closed.

Thus, when the rotating shaft 3 is inserted, as shown in FIGS. 2A and 3, the bent portion is curved, so that the notched grooves H are closed on the side of the fluid chamber R and open on the low-pressure side. If the grooves H are worked by the conventional hot coining which is frequently used in the art, they have a fixed width when the shaft 3 is inserted. In this arrangement, therefore, although the fluid M leaked by the pumping effect is returned to the fluid chamber R while the rotating shaft 3 is rotating, there is a possibility of the fluid M in the grooves with the fixed width gradually leaking to the low-pressure side A when the shaft 3 is at a standstill. According to the first embodiment, in contrast with this, the notched grooves H are closed on the fluid chamber side, and are gradually opened toward the low-pressure side A, as shown in FIG. 3. In this arrangement, the surface tension of the fluid M and foreign substances (abrasion dust, carbonized oil, etc.) in the grooves H effectively prevent seal passage, so that no fluid leakage occurs when the rotating shaft 3 is at a standstill.

Arranged in this manner, the first embodiment provides the following effects.

When the rotating shaft 3 is nonrotating, the first sealing lip 10 of the first sealing element 7, formed of the elastic rubber material, is elastically in contact with the shaft 3, thereby preventing a fluid leakage.

When the rotating shaft 3 is rotating, on the other hand, the fluid from the fluid chamber R is allowed to permeate the gap between the outer peripheral surface of the shaft 3 and the inner peripheral surface of the first sealing lip 10. Accordingly, the inner peripheral surface of the sealing lip 10 is lubricated with the fluid, so that the lip 10 can be prevented from being worn out or heated, thus enjoying improved durability.

While the rotating shaft 3 is rotating, there is a small fluid leakage, since the fluid from the fluid chamber R is allowed to permeate the gap between the outer peripheral surface of the shaft 3 and the inner peripheral surface of the first sealing lip 10. However, the second sealing element 9 includes the second sealing lip 16 which is in contact with the outer peripheral surface of the rotating shaft 3, and the annular grooves H are formed on the inner peripheral surface of the sealing lip 16. Therefore, a high contact surface pressure can be obtained between the grooves H. Thus, the second sealing lip 16 of the second sealing element 9 can prevent the fluid from the first sealing element 7 from leaking to the low-pressure side A.

In this manner, the fluid leakage can be securely prevented without regard to the state, rotating or nonrotating, of the rotating shaft 3, and the durability of the seal can be improved.

If the first sealing lip 10 of the first sealing element 7 suffers any trouble attributable to wear, thermal deterioration, refrigerant blistering, etc., the second sealing lip 16 of the second sealing element 9 can securely prevent the fluid leakage, thus ensuring a reliable sealing performance. Further, the second sealing lip 16 gets intimate with the rotating shaft 3 as the shaft 3 rotates. Owing to the prevention of seal passage by the surface tension of the fluid M and foreign substances and the like, moreover, no leakage occurs when the shaft 3 is at a standstill. Since the second sealing element 9 is intimately in contact with the first sealing element 7, furthermore, it can produce a backup effect to prevent deformation of the sealing lip 10 of the first sealing element 7.

In FIG. 2A, numeral 18 denotes a retaining ring which is fixed to the inner surface 2a of the hole 2 of the housing 1, and prevents disengagement of the rotating shaft.

Figure 4:
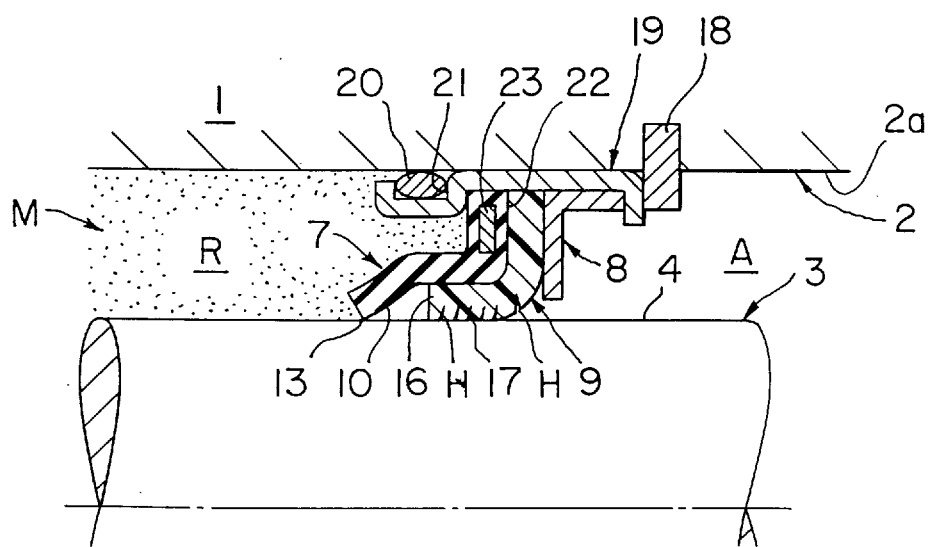
FIG. 4 is a sectional view of a rotating shaft seal according to a modification of the first embodiment.

FIG. 4 shows a rotating shaft seal according to a modification of the first embodiment, which comprises a retainer 19 having an outer peripheral groove 21 for an O-ring 20. A first sealing element 7, which is formed of an elastic rubber material, includes a first sealing lip 10 and a connecting portion 22 continuous with the sealing lip 10. A reinforcement 23 is embedded in the continuous portion 22. Also in this case, the first sealing lip 10 of the first sealing element 7 has a permeation allowing rim 13, and a second sealing lip 9 is a flat ring-shaped plate formed of a synthetic resin. An annular groove is formed on a shaft contact surface 17 of a second sealing lip 16. Thus, the rotating shaft seal shown in FIG. 4 can provide the same functions and effects of the foregoing rotating shaft seal shown in FIGS. 2A and 3.

Five sample units (with helical or notched groove(s) H) of the rotating shaft seal shown in FIG. 2A were prepared, and constant-pressure airtightness test, rapid-compression airtightness test, and rapid-decompression airtightness test were conducted on each sample.

The constant-pressure airtightness test is a test in which pressure containers fitted with the rotating shaft seals are pressurized to test pressures by means of nitrogen gas in a manner such that they are immersed in water, left to stand for three minutes, and then checked for gas leakages. Pressures of 10 kgf/cm$^2$, 20 kgf/cm$^2$, and 36 kgf/cm$^2$ were used as the test pressures.

The rapid-compression airtightness test is a test for measuring gas leakages observed when the pressure of each pressure container is increased from the atmospheric pressure to the test pressures (10, 20, and 36 kgf/cm$^2$) in two or three seconds.

The rapid-decompression airtightness test is a test for measuring gas leakages observed when the pressure of each pressure container is reduced from the test pressures (10, 20, and 36 kgf/cm$^2$) to the atmospheric pressure in about one second.

The results of these tests indicate no leakage at all with any of the samples.

Subsequently, an in-rotation sealing performance test (operating performance test) was conducted on two samples under the conditions shown in Table 1. Also in this case, no leakage was indicated at all.

TABLE 1

Operating Performance Test Conditions

| | |
|---|---|
| Shaft | φ12.7, 1.6 S (Plunge-grinder finish) HRc55 or more |
| Shaft run out | 0.03 mm TIR |
| Housing | Aluminum, φ23.1 |
| Shaft to base eccentricity | 0.10 mm TIR or less |
| Sealing fluid | Refrigerant R134a plus PAG refrigerator oil |
| Oil level | 1/8 of shaft |
| Oil temperature | 100° C. |
| Pressure | 4.5 kgf/cm$^2$G |
| Shaft rotational speed | 9000 rpm |
| Testing time | 532-hour operation based on a basic cycle consisting of 20 hours of run and 4 hours of suspension (68 and 4 hours for holidays) |

After the operating performance test was finished, moreover, a stationary leakage test was conducted in a manner such that the rotating shaft was kept at a standstill at 4.5 kgf/cm$^2$ and 100° C. for 100 hours. Also in this case, no leakage was indicated for any of the samples.

The degree of vacuum for each sample was 755 mmHg, and its increase after 2 hours of standing was 5 mmHg.

The test results indicate that the rotating shaft seals exhibit a very high sealing performance without regard to the state, rotating or nonrotating, of the rotating shaft.

It is to be understood that the present invention is not limited to the embodiment described above, and that various changes and modifications may be effected therein by one skilled in the art without departing from the scope or spirit of the invention. If the notched grooves H on the sealing lip 16 of the second sealing element 9 have an independent circular shape each, for example, they may be increased or decreased in number or arranged at irregular pitches. In the case of the helical groove, the helical pitches may be changed freely.

Moreover, the depth of the notched grooves may be changed without lowering the strength of the sealing lip 16 and the sealing performance.

Arranged in this manner, the first embodiment provides the following effects.

(1) High durability for pressure-resisting applications (e.g., compressor seal for car air conditioner).

(2) Satisfactory sealing effect even for a gas-liquid mixture without regard to the state, rotating or nonrotating, of the rotating shaft 3.

(3) Good adaptation to high-speed, high-pressure operation due to the main use of the second sealing lip 16 of the second sealing element 9, which is composed of the synthetic resin, as the sealing means for the rotating shaft 3 in rotation.

(4) The first sealing lip 10 of the first sealing element 7 and the second sealing lip 16 of the second sealing element 9 are kept lubricated on the rotating shaft 3, so that the wear resistance is low enough to prevent the sealing lips 10 and 16 from wearing or heating to high temperature.

(5) High eccentricity performance due to the main use of the second sealing lip 16 of the second sealing element 9, which is composed of the synthetic resin, as the sealing means.

(6) Stable static sealing performance due to the availability of the first sealing lip 10 of the first sealing element 7 as the sealing means for the rotating shaft 3 at a standstill.

(7) Since the grooves on the second sealing lip 16 are formed by notching, the grooving work is easier and lower in cost than the conventional hot coining which is frequently used in the art.

(8) Vacuum performance comparable to that of the conventional arrangement.

(9) No leakage resulting directly from breakage of the first sealing lip 10 of the first sealing element 7.

Figure 5:
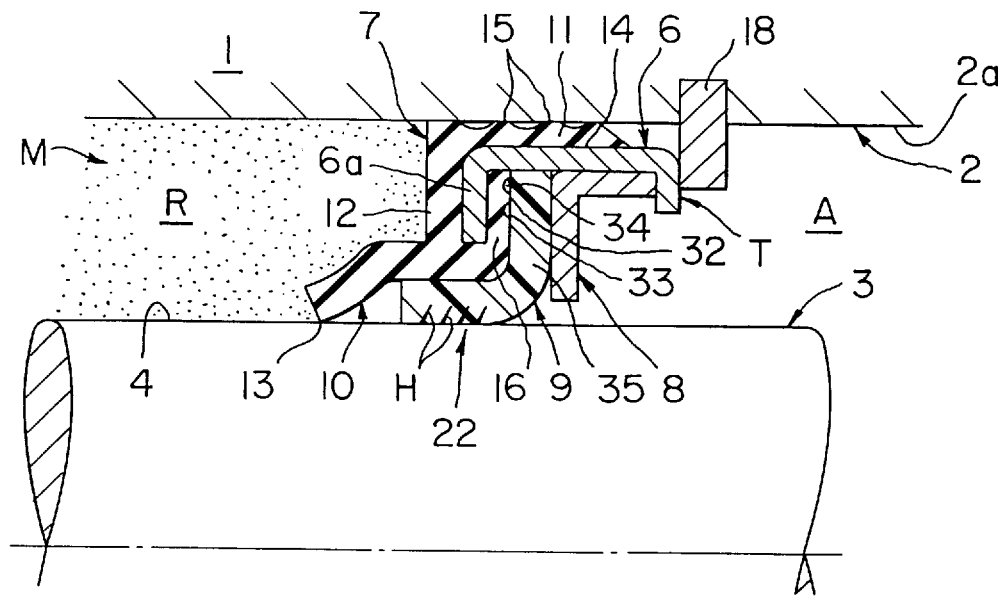
FIG. 5 is a sectional view of a rotating shaft seal according to a second embodiment of the invention.
Figure 6:
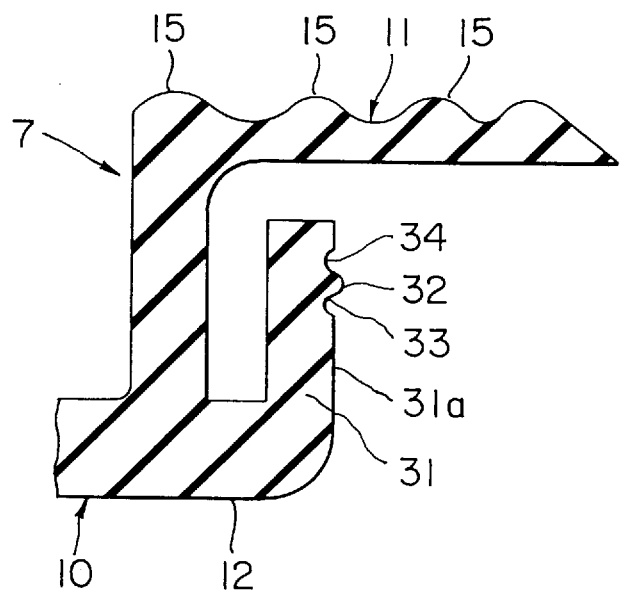
FIG. 6 is an enlarged sectional view of a first sealing element of the rotating shaft seal shown in FIG. 5.
Figure 7:
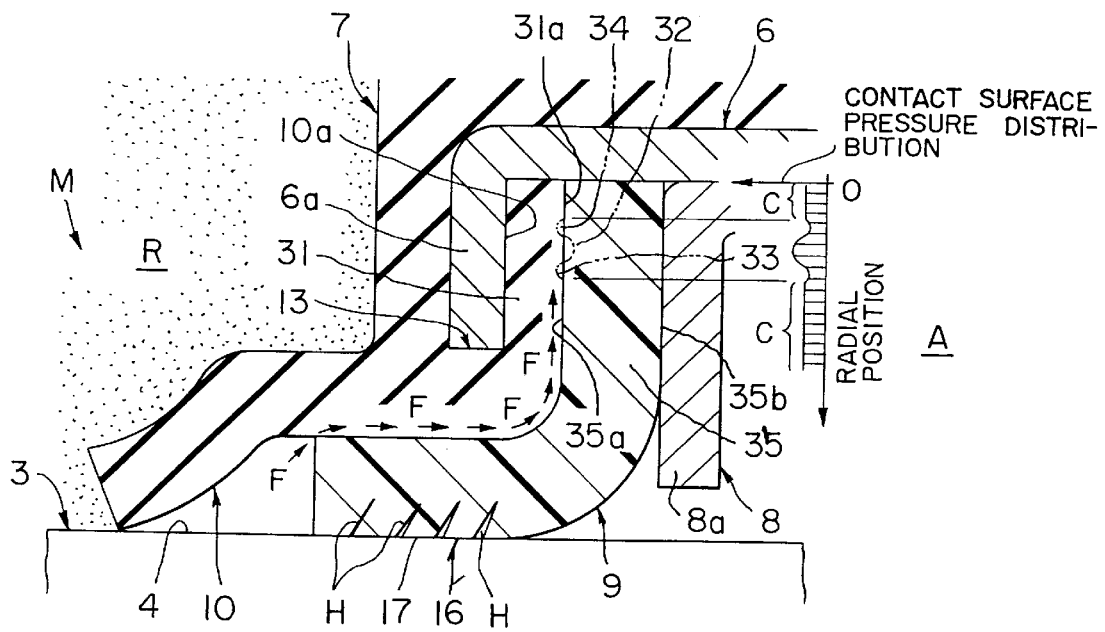
FIG. 7 is an enlarged sectional view of the first sealing element of the rotating shaft seal shown in FIG. 5.
Figure 8:
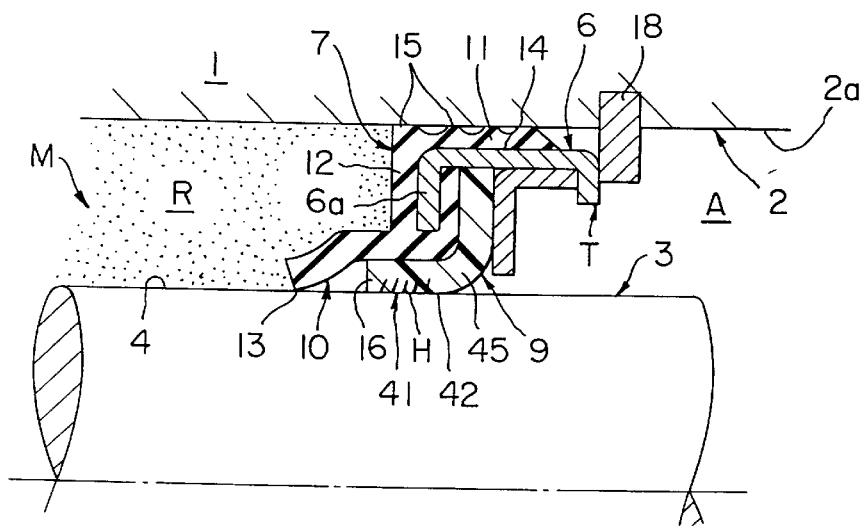
FIG. 8 is a sectional view of a rotating shaft seal according to a third embodiment of the invention.

Referring now to FIGS. 5 to 7, a rotating shaft seal according to a second embodiment of the present invention will be described. In the description to follow, like reference numerals are used to designate the same portions as the first embodiment includes, and a detailed description of those portions is omitted.

In the second embodiment, a connecting piece 12 of a first sealing element 7 includes a flat ring-shaped plate portion 31, which covers an inner end face 10a of an inner collar portion 6a of a first retainer 6, as shown in FIGS. 6 and 7. Formed on an end face 31a of the flat plate portion 31, which is in contact with a second sealing element 9, is a small ring-shaped projection 32 which shares a central axis with the first retainer 6.

Inner and outer small depressions 33 and 34 are formed extending along the inner and outer skirt portions, respectively, of the small projection 32. In the illustrated arrangement, the projection 32 and the depressions 33 and 34 have an arcuate section each.

One end face 35a of a flat (not curved), ring-shaped outer peripheral edge portion 35 of the second sealing element 9 is in contact with an end face 31a of the flat plate portion 31 of the first sealing element 7. An inner collar portion 8a of the second retainer 8 is in contact with the other end face 35b of the outer peripheral edge portion 35. The second retainer 8 is pressed toward the flat plate portion 31 by a caulked portion T (see FIG. 5) of the first retainer 6, whereby the outer peripheral edge portion 35 of the second sealing element 9 is sandwiched between the elements 7 and 9.

As a result, the one end face 35a of the outer peripheral edge portion 35 of the second sealing element 9 and the end face 31a of the flat plate portion 31 of the first sealing element 7 are intimately in contact with each other under a predetermined contact surface pressure. Thus, an internal leakage can be prevented such that the fluid M, having leaked through a first sealing lip 10 of the first sealing element 7 toward the second sealing element 9, leaks to the low-pressure side A, passing between the elements 7 and 9, as indicated by arrows F in FIG. 7.

In this manner, the internal leakage can be prevented satisfactorily by means of the pressure of contact (indicated by symbol C) between the respective flat ring-shaped portions of the end face 31a of the flat plate portion 31 of the first sealing element 7 and the one end face 35a of the outer peripheral edge portion 35 of the second sealing element 9, as shown in FIG. 7. Since the small projection 32 of the flat plate portion 31 is compressed by the one end face 35a of the outer peripheral edge portion 35, moreover, the contact surface pressure between the end faces 31a and 35a suddenly increases within a range corresponding to the projection 32, so that the sealing performance is improved in the contact region between the projection 32 and the one end face 35a. Thus, the internal leakage can be prevented securely.

In this case, the caulked portion T (see FIG. 5) is not good enough to prevent the contact surface pressure between the one end face 35a of the outer peripheral edge portion 35 of the second sealing element 9 and the end face 31a of the flat plate portion 31 of the first sealing element 7 from being entirely lowered. Thus, the pressure between the flat contact surfaces becomes insufficient. If the fluid M penetrates the gap between the first and second sealing elements 7 and 9, as indicated by arrows F in FIG. 7, therefore, the contact surface pressure maintained in the contact region between the small projection 32 and the one end face 35a is high enough to keep the fluid M from leaking, so that the internal leakage can be prevented (see FIG. 7).

Even though the caulked portion T (see FIG. 5) is not good enough, moreover, the increase of the contact surface pressure due to the presence of the small projection 32 compensates for the reduction of the force to hold the outer peripheral edge portion 35 of the second sealing element 9. Thus, the element 9 can be prevented from rotating together with the rotating shaft 3.

Preferably, the total capacity of the inner and outer small depressions 33 and 34 should be made greater than the volume of the small projection 32 so that the depressions 33 and 34 can fully absorb the compressive deformation of the projection 32 by the second sealing element 9. In this arrangement, the end face 31a of the flat plate portion 31 and the one end face 35a of the outer peripheral edge portion 35 can securely come into intimate contact with each other without being hindered by the small projection 32. Accordingly, there is no possibility of a gap being formed between the end faces 31a and 35a such that the contact surface pressure is locally reduced by a large margin. Thus, the sealing performance cannot be lowered.

The second embodiment is not limited to the arrangement described above, and its design may be freely changed or modified without departing from the scope or spirit of the present invention. For example, a plurality of small projections 32, inner small depressions 33, and outer small depressions 34 may be arranged concentrically, and their respective positions and shapes may be changed freely.

Arranged in this manner, the second embodiment can produce the following effects.

In the rotating shaft seal according to the second embodiment, the small projection 32 of the flat plate portion 31 of the first sealing element 7 is compressed by the one end face 35a of the outer peripheral edge portion 35 of the second sealing element 9, and the contact surface pressure has its peak in the region corresponding to the projection 32. Accordingly, the fluid M can be securely kept from leaking to the low-pressure side A from between the first and second sealing elements 7 and 9. Thus, the internal leakage can be prevented.

Even though the caulked portion T of the first retainer 6 or the like is not good enough to prevent the contact surface pressure between the one end face 35a of the outer peripheral edge portion 35 of the second sealing element 9 and the end face 31a of the flat plate portion 31 of the first sealing element 7 from being entirely lowered, the fluid M can be prevented from leaking in the contact region between the small projection 32 and the one end face 35a. Thus, the sealing performance against the internal leakage can be stabilized, and the second sealing element 9 can be prevented from rotating together with the rotating shaft 3.

It is necessary only that a mold tool for molding the first sealing element 7 be formed having molding surfaces which correspond to the small projection 32 and the inner and outer small depressions 33 and 34. Accordingly, the present invention can be applied with ease, and an increase in cost can be prevented.

Referring now to FIGS. 8 to 12, a rotating shaft seal according to a third embodiment of the present invention will be described. In the description to follow, like reference numerals are used to designate the same portions as the first or second embodiment includes, and a detailed description of those portions is omitted.

Figure 9:
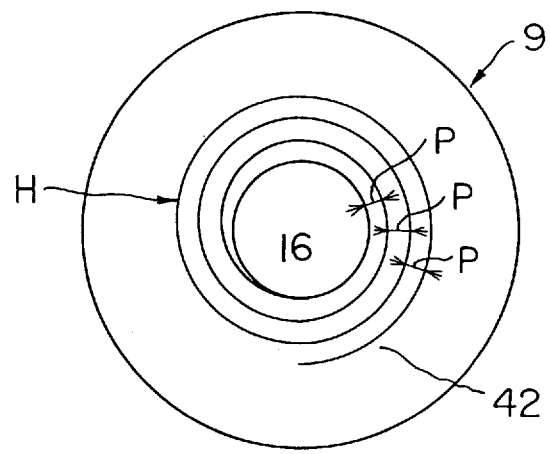
FIG. 9 is a plan view showing a second sealing element of the rotating shaft seal of FIG. 8 with its inner peripheral edge portion unbent.
Figure 10:
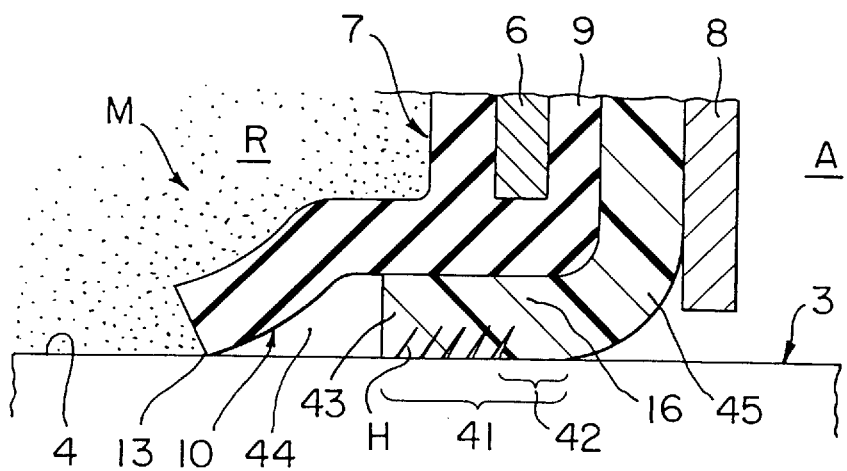
FIG. 10 is an enlarged sectional view of the rotating shaft seal shown in FIG. 8.

A second sealing element 9 is formed by bending the inner peripheral edge portion of a flat ring-shaped plate, such as the one shown in FIG. 9, toward the fluid chamber R, as shown in FIG. 10. The inner peripheral edge portion constitutes a second sealing lip 16 which is in plane contact with the outer peripheral surface 4 of the rotating shaft 3.

A rotating-shaft contact surface 41 of the second sealing lip 16 is formed having a helical groove H and a flat surface portion 42. One end of the groove H communicates with a gap portion 44 between a distal end portion 43 of the lip 16 and a first sealing lip 10 of a first sealing element 7. The flat surface portion 42 serves to cut off the other end of the helical groove H from the low-pressure side A.

As shown in FIG. 9, the helical groove H is formed around the axis of the second sealing element 9 in the form of a flat ring-shaped plate. The pitches P of the groove H, which may be regular or irregular, may be changed freely.

As shown in FIG. 10, the helical groove H is cut so as to be inclined toward the low-pressure side A with respect to the contact surface 41. For improved sealing performance, at least the distal end side of the groove H is closed on the contact surface 41 of the second sealing lip 16.

The turning direction of the helical groove H is a direction in which a pumping effect is produced such that the fluid M in the groove is returned to the fluid chamber R. As the rotating shaft 3 rotates, therefore, it causes a free-running flow of the viscous fluid M from the low-pressure side A toward the fluid chamber R, so that the fluid M in the groove H is pushed back. Thus, the fluid M can be prevented from leaking to the low-pressure side A.

Since the helical groove H is not formed on a curved portion 45 of the second sealing element 9, so that the portion 45 has good strength and rigidity. Even if a high pressure from the fluid chamber R acts on the sealing element 9, therefore, the curved portion 45 can be prevented from bending or projecting to the low-pressure side A.

The flat surface portion 42 serves to prevent the fluid M from leaking from the fluid chamber R to the low-pressure side A when the rotating shaft 3 is kept at a standstill for a long period of time. More specifically, the flat surface portion 42 is intimately in plane contact with the outer peripheral surface 4 of the rotating shaft 3 so that the helical groove H is cut off in the middle of the contact surface 41. If the fluid M leaks from the fluid chamber R into the gap portion 44 and then gets into the groove H, therefore, it can be securely prevented from leaking to the low-pressure side A.

Figure 11:
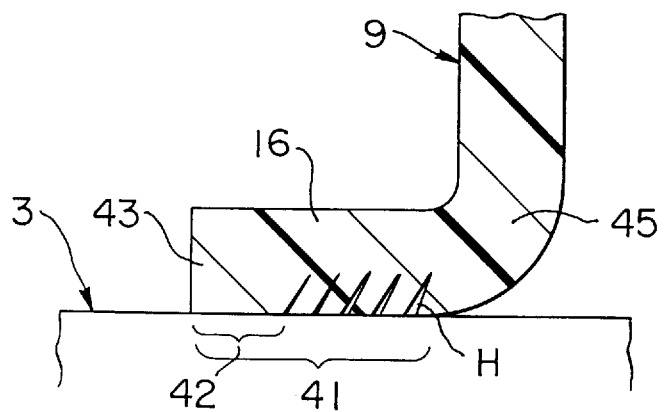
FIG. 11 is an enlarged sectional view showing a first modification of the second sealing element of the rotating shaft seal according to the third embodiment.
Figure 12:
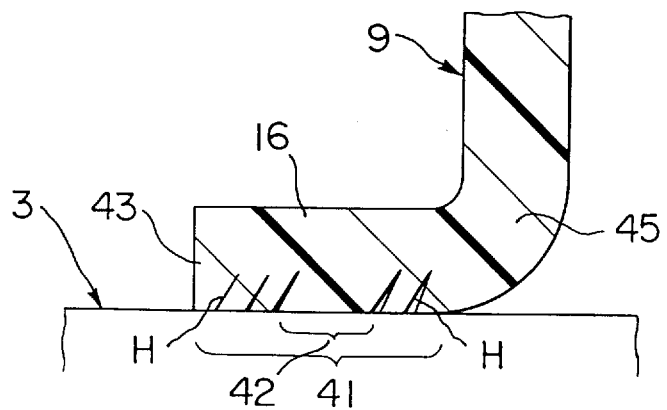
FIG. 12 is an enlarged sectional view showing a second modification of the second sealing element of the rotating shaft seal according to the third embodiment.

The position of the flat surface portion 42 of the contact surface 41 may be changed freely. For example, the portion 42 may be located on the distal-end side of contact surface 41, as shown in FIG. 11, or in the middle of the surface 41, as shown in FIG. 12, without reducing the sealing effect. If the flat surface portion 42 is located on the curved-portion side of the contact surface 41, as shown in FIG. 10, however, it can apply the greatest force of pressure to the outer peripheral surface 4 of the rotating shaft 3, so that the sealing effect is increased and stabilized.

Arranged in this manner, the third embodiment can produce the following effects.

In the rotating shaft seal according to the third embodiment, which is adapted for use in a compressor for a car air conditioner, in particular, the fluid M urged to the helical groove H to the low-pressure side A can be securely prevented from leaking by means of the flat surface portion 42 of the sealing element 9, so that the sealing performance is stable.

Since the helical groove H is formed only within the range of the rotating-shaft contact surface 41, moreover, the second sealing lip 16 of the sealing element 9 can be prevented from bending or projecting to the low-pressure side A.

What is claimed is:

1. A seal for rotatable support on a rotating shaft to seal a fluid from a fluid chamber leaking along the rotating shaft, the seal comprising:

a first sealing element including a first sealing lip for extending axially along an outer peripheral surface of the rotating shaft in a direction toward the fluid chamber when the seal is rotatably supported on the rotating shaft, the first sealing lip having an inner rim then on the inner peripheral surface thereof for allowing the fluid from the fluid chamber to permeate the outer peripheral surface of the rotating shaft as the rotating shaft rotates, the inner rim having a sectional profile with a curvature radius of from 0.005 to 0.3 mm in a free state before the contact with the shaft; and a second sealing element for extending axially along the outer peripheral surface of the rotating shaft in the direction but at a greater distance from the fluid chamber than the first sealing element when the seal is rotatable supported on the rotating shaft and including a second sealing lip then in contact with the outer peripheral surface of the rotating shaft, the second sealing lip having annular grooves formed on the inner peripheral surface thereof so as to extend at least substantially around the circumference of the rotating shaft when the seal is rotatably supported on the rotating shaft, the second sealing element being curved so that at least one of the annular grooves is closed on a side of the second sealing element toward the fluid chamber and at least one of the annular grooves is open at an opposite side.

2. The seal according to claim 1, wherein the inner rim has a flat profile before the sealing contact about the shaft.

3. The seal according to claim 1, wherein the first sealing element is formed of an elastic rubber material consisting of a hydrogenated acrylonitrile-butadiene rubber compound.

4. The seal according to claim 3, wherein at least the first sealing lip is molded from the elastic rubber material at least sufficiently to form the innermost rim thereon.

5. The seal according to claim 1, wherein at least some of the annular grooves are helical and turn in an opposite direction to a rotating direction of the shaft.

6. The seal according to claim 5, wherein the helical grooves are in the portion of the innermore surface that is in contact with the shaft and disconnected from another of the annular grooves.

7. The seal according to claim 1, wherein at least some of the annular grooves are in the portion of the innermore surface that is in contact with the shaft.

8. The seal according to claim 1, wherein all of the annular grooves are in the portion of the innermore surface that is in contact with the shaft.

9. The seal according to claim 1, wherein the first sealing element includes:

a plate portion intimately in contact with the second sealing element, extending radially outward and having a small ring-shaped projection;

an inner small ring-shaped depression radially inside the small projection and continuous there with; and an outer small ring-shaped depression radially outside the small projection and continuous with.

10. The seal according to claim 1, wherein the second seal lip is formed of a synthetic resin consisting essentially of a fluoroplastic compound.

11. The seal according to claim 4, wherein at least some of the annular grooves are helical and turn in an opposite direction to a rotating direction of the shaft.

12. The seal according to claim 4, wherein at least some of the annular grooves are in the portion of the innermore surface that is in contact with the shaft and concentric.

13. The seal according to claim 11, wherein the second seal lip is formed of a synthetic resin consisting essentially of a fluoroplastic compound.

14. The seal according to claim 12, wherein the second seal lip is formed of a synthetic resin consisting essentially of a fluoroplastic compound.

15. The seal according to claim 2, wherein at least some of the annular grooves are in the portion of the innermore surface that is in contact with the shaft and concentric.

16. The seal according to claim 1, wherein the first annular sealing element has a relation $\alpha<\beta$ where $\alpha$ is an angle of the one side of the first annular sealing element to the axis, and $\beta$ is an angle of the opposite side of the first annular sealing element to the axis.

17. The seal according to claim 1, wherein said curvature radius is from 0.01 to 0.1 mm in free state.

18. A seal for use about a rotatable shaft to seal a fluid on one axial side of the seal from leaking along the shaft to an opposite side of the seal, the seal comprising:

a first annular sealing element including one side for location at a fluid, the first annular sealing element including a first sealing lip with a radially innermost rim for sealing contact about an outer peripheral surface of a rotatable shaft when the shaft is not rotating and for allowing the fluid to pass axially along the outer peripheral surface of the shaft from the one side to an axially opposite side of the first annular sealing element when the shaft is rotating;

a second annular sealing element, the second annular sealing element including a second sealing lip having one side axially spaced from said opposite side of the first sealing element and a radially innermost surface having at least a portion for contact with the outer peripheral surface of the shaft, the innermost surface having annular grooves and being curved so that at least one of the annular grooves at the one side of the second annular sealing element is closed and at least one of the annular grooves at an opposite side of the second annular sealing element is open; and an annular plate portion extending radially outward from said first annular sealing element and being in tight contact with said second annular sealing element, said annular plate portion having, on a surface thereof in tight contact with said second sealing element, a ring-shaped projection, an inner ring-shaped depression radially inwardly contiguous to said projection, and an outer ring-shaped depression radially outwardly contiguous t said projection.

19. A seal for rotating shaft according to claim 18, wherein said inner and outer depressions have a total capacity that is greater than the volume of said projection.

20. A seal for use about a rotatable shaft to seal a fluid on one axial side of the seal for leaking along the shaft to an opposite side of the seal, the seal comprising:

a first annular sealing element including one side for location at a fluid, the first annular sealing element including a first sealing lip with a radially innermost rim having an axial cross-sectional profile with a curvature radius of from 0.005 to 0.3 mm in a free state before the sealing contact about the shaft for sealing contact about an outer peripheral surface of a rotatable shaft when the shaft is not rotating and for allowing the fluid to pass axially along the outer peripheral surface of the shaft from one side to an axially opposite side of the first annular sealing element when the shaft is rotating;

a second annular sealing element, the second annular sealing element including a second sealing lip having one side axially spaced from said opposite side of the first sealing element and a radially innermost surface having at least a portion for contact with the outer peripheral surface of the shaft, the innermost surface having annular grooves and being curved so that at least one of the annular grooves at the one side of the second annular sealing element is closed and at least one of the annular grooves at an opposite side of the second annular sealing element is open, said second sealing element having a radial planar surface facing said first sealing element; and an annular plate portion extending radially outward from said first annular sealing element and being in tight contact with said planar surface of the second annular sealing element, said annular plate portion having, on a surface thereof facing said planar surface, a ring-shaped projection, an inner ring-shaped depression radially inwardly contiguous to said projection, and an outer ring-shaped depression radially outwardly contiguous to said projection, said inner and outer depressions having a total capacity that is greater than the volume of said projection.

21. A seal for rotating shaft rotatably supported on a rotating shaft and used to seal a fluid from a fluid chamber leaking along the rotating shaft, the rotating shaft seal comprising:

a first sealing element located on the side nearer to the fluid chamber, and including a first sealing lip in contact with the outer peripheral surface of the rotating shaft, the first sealing lip having an inner rim on the inner peripheral surface thereof for allowing the fluid from the fluid chamber to permeate the outer peripheral surface of the rotating shaft, as the rotating shaft rotates, the inner rim having a sectional profile with a curvature radius of from 0.005 to 0.3 mm in a free state before the contact with the shaft;

a second sealing element located at a greater distance from the fluid chamber than the first sealing element, and including a second sealing lip in contact with the outer peripheral surface of their rotating shaft, the second sealing lip having an annular groove formed on the inner peripheral surface thereof so as to extend substantially along the circumference of the rotating shaft, when the rotating shaft seal is mounted on the rotating shaft, the second sealing element being curved so that the annular groove is closed on the side of the fluid chamber and open on the low-pressure side, said second sealing element having a radial planar surface facing said first sealing element;

an annular plate portion extending radially outward from said first annular sealing element and being in tight contact with said planar surface of the second annular sealing element, said annular plate portion having, on a surface thereof facing said planar surface, a ring-shaped projection, an inner ring-shaped depression radially inwardly contiguous to said projection, and an outer ring-shaped depression radially outwardly contiguous t said projection, said inner and outer depressions having a total capacity that is greater than the volume of said projection.

* * * * *